C. G. SCHMITTNER.
HEIGHT GAGE.
APPLICATION FILED JUNE 15, 1914.
1,181,412.
Patented May 2, 1916.
2 SHEETS—SHEET 2.
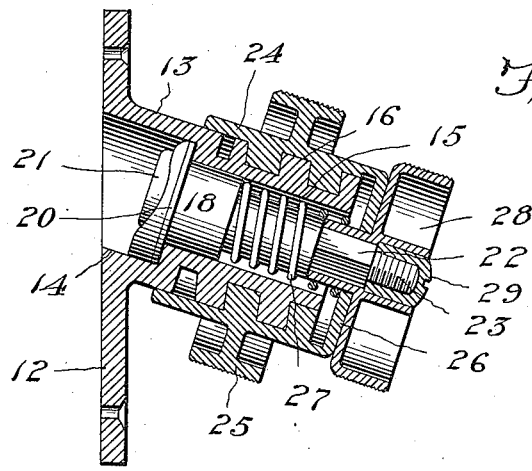
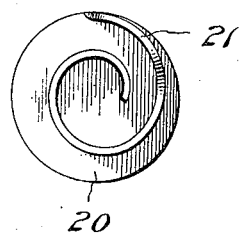
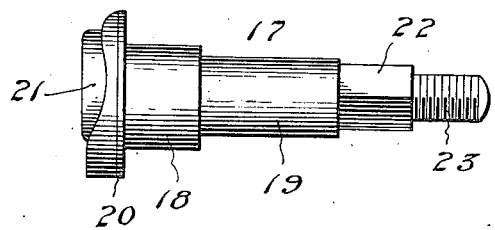
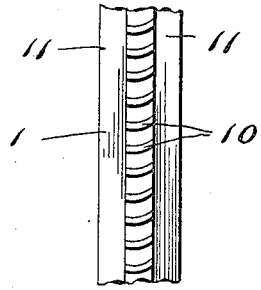
Witnesses
Paul M. Hunt
Lloyd W. Patch
Inventor
Charles G. Schmittner.
By Richard Owen
Attorney

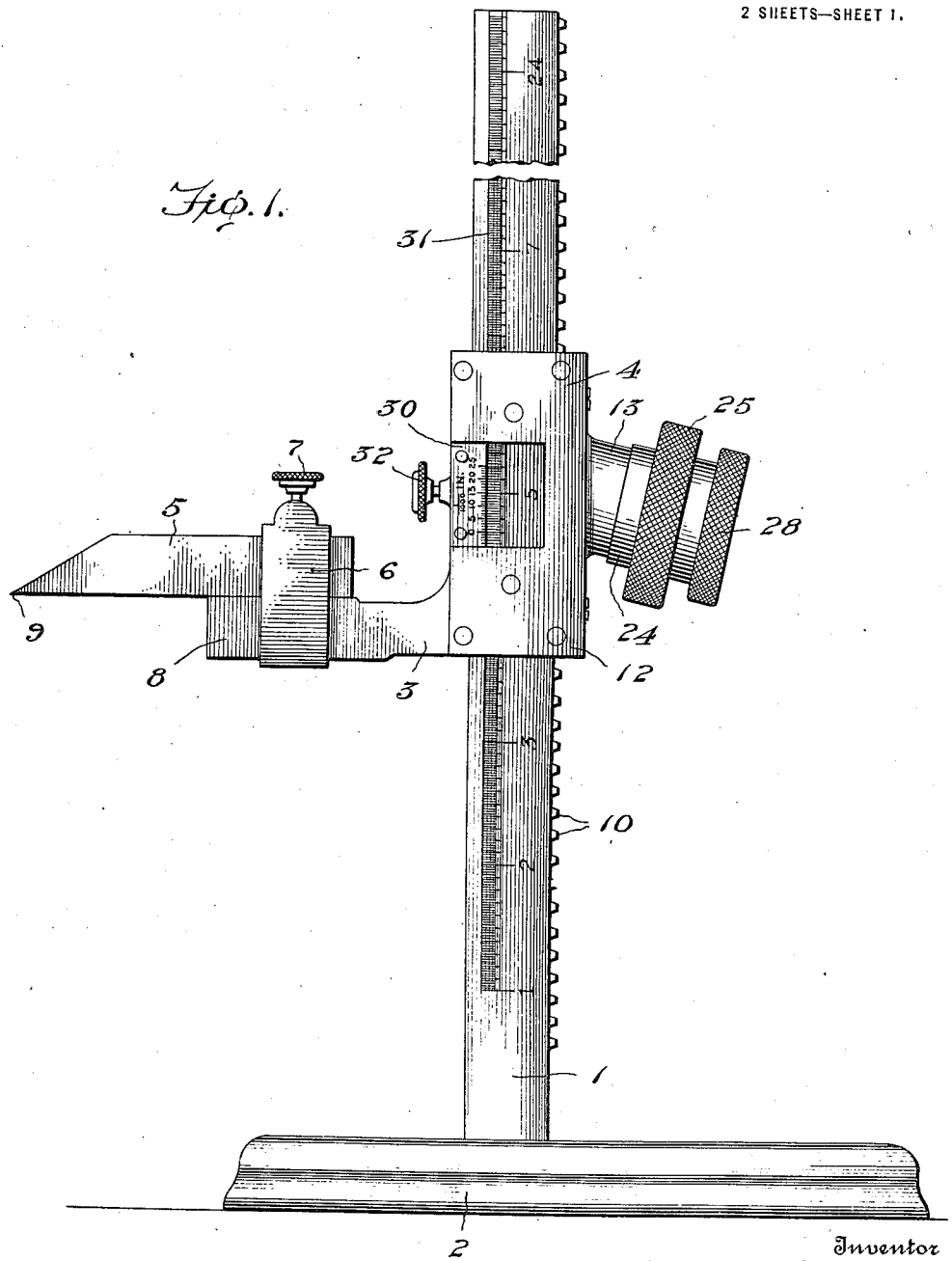

UNITED STATES PATENT OFFICE.

CHARLES G. SCHMITTNER, OF DETROIT, MICHIGAN.

HEIGHT-GAGE.

1,181,412. Specification of Letters Patent. Patented May 2, 1916.

Application filed June 15, 1914. Serial No. 845,223.

*To all whom it may concern:*

Be it known that I, CHARLES G. SCHMITTNER, a subject of the Emperor of Austria-Hungary, residing at Detroit, in the county of Wayne and State of Michigan, have invented certain new and useful Improvements in Height-Gages, of which the following is a specification.

The object of my invention is to provide a height gage which may be used to obtain the height of a projection from a plane surface, the location of a bushing in a gate, or in other like connection, and one which requires but a single manual manipulation to obtain the desired adjustment.

A further object is to provide a gage comprising few parts, simply and rigidly constructed and mounted, and so arranged that the possibility of lost motion or of springing of the parts with respect to each other thus giving inaccurate measurements is absolutely precluded.

With other objects in view, which will be referred to, my invention consists in the peculiar combination and novel arrangement of parts, such as will be hereinafter more fully described in connection with the accompanying drawings and more particularly pointed out in the appended claims.

In the drawings:—Figure 1 is a view in side elevation of my improved height gage. Fig. 2 is a longitudinal vertical sectional view through the mechanism adapted to adjust the height of the movable jaw to obtain a measurement. Fig. 3 is a view in elevation of the adjusting worm. Fig. 4 is a view in end elevation of the member disclosed in Fig. 3. Fig. 5 is a fragmentary view in elevation to better illustrate the structure of the measuring bar.

The measuring bar 1 is rigidly mounted to extend in an upright direction upon the base or fixed jaw 2, and this fixed jaw is accurately surfaced and otherwise constructed so that it will form an accurate member from which to project a measurement.

A movable jaw 3 is provided with an open portion through which the measuring bar 1 is received and the fit between these two members is such that lost motion is precluded, the bearing 4 of the jaw 3 being made sufficiently long at its engagement with the measuring bar 1 to prevent twisting or springing of this movable jaw with respect to the measuring bar. It is perhaps preferable that the extension arm 5 be provided to be secured by the clamp 6 and set screw 7 to the arm 8 of the movable jaw 3 and this extension arm has a knife-blade edge formed on its outer end at 9 so that the measurements can be taken with the greatest accuracy.

Under ordinary conditions, the movable jaw 3 is free to have sliding travel in an upward and downward direction upon the measuring bar 1 by simply being manually raised and lowered, however, only the roughest measurements can be taken in this way and the finer, more accurate, adjustment necessary to take measurements to the thousandth of an inch cannot be obtained. The measuring bar 1 has the worm rack 10 formed to extend longitudinally thereof on the rear edge in the form of a centrally disposed rib and on each side of the worm rack 10 the slide bearings 11 are provided to be engaged in the bearing portion of the movable jaw 3, and in this way any springing or swinging movement of the movable jaw to make possible inaccurate measurement as obtained at the end of the projection arm is absolutely precluded. A plate 12 is secured to the rear end of the bearing portion 4 of the movable jaw 3 and this plate has a worm case 13 provided to extend therefrom at an angle downwardly. This case 13 has the two longitudinal bores 14 and 15 provided through the axial centers thereof and the bore 15 is made of a smaller diameter than the bore 14 so that a shoulder is provided at their points of communication, and a screw-thread 16 is provided on the outer end of this case 13. The worm 17 is made of the two diameters 18 and 19 in its body portion, and a head 20 is formed on that end of the body portion adjacent the larger diameter 18. This worm 17 has the worm threads 21 provided on the end face of the head 20, the configuration of which is best shown in Fig. 4, and the body portion at the end opposite to the disposition of the head 20 is squared at 22 and the extreme end is made of a less transverse dimension and has the screw threads 23 provided thereon.

An adjusting collar 24 has internal screw threads to be received upon the screw threaded portion 16 of the case 13 and the hand wheel 25 formed integral with this sleeve has the outer surface thereof knurled so that this sleeve can be turned to move the adjusting collar onto the member 13. At its outer end this sleeve 24 is partly closed as at 26, and a coil spring 27 is received around the diameter 19 of the worm 17 to bear against the shoulder formed by the larger diameter 18 of this worm and against the closing end 26 of the sleeve in such relation that the worm 17 will be normally resiliently moved to one of its extreme positions.

A hand wheel 28 which is dulled or otherwise roughened to provide a grip for the hand has a squared socket 22' to be fitted over the squared portion 22 of the worm 17 and a cap nut 29 is provided to be received upon the screw threads 23 provided on the end of the worm 17 to hold the hand wheel 28 properly secured.

In use, the worm 17 will be brought to the position shown in Fig. 2 either by grasping the hand wheel 28 and applying an outward pulling tension thereon to overcome the inward pressing tension of the spring 27, or by turning the hand wheel 25 to draw the sleeve 24 to the position indicated in this figure, when the parts would be held rigidly against the engagement of worm threads 21 with the teeth of the worm rack 10. With the parts in this relation, the movable jaw 3 may be manually adjusted up and down on the measuring bar 1 and in this way rough or approximate measures may be obtained, then, the worm 17 is again released and is permitted to move under the tension of the spring 27 to a position that the worm thread 21 thereof engages with the teeth of the worm rack 10 and by turning the hand wheel 28 in one direction or the other the finest and most accurate adjustment of the movable jaw, and consequently the measuring edge 9 of the second arm 5, can be obtained. A vernier 30 is carried by the movable jaw 3 in proximity to the scale 31 of the measuring bar 1 so that the most accurate and finest measurements can be taken and a set screw 32 is provided through the bearing portion 4 of this movable jaw to be brought into engagement with the front edge of the measuring bar 1 to hold the movable jaw 3 in the position to which it has been adjusted, and to thus preserve the measurement as taken. With the use of this gage, it will be understood that the set screw 32 should always be loosened before the hand wheel 28 is turned, but, if the instrument be used by one not experienced in its operation and the hand wheel 28 be turned while the clamp screw 32 is yet in its retaining position, the only effect will be that the worm thread 21 will run out of its proper engagement in the teeth of the worm rack 10 and will move to an inoperative position against the tension of the spring 27, thus no part of the structure will be broken, strained, or otherwise disarranged or injured.

From the foregoing, it will be seen that I have provided a gage which may be used in taking height measurements quickly and accurately. Further, it will be obvious that there cannot be lost motion, twisting, springing or other relative movement between the parts to tend toward inaccuracy in the measurements as obtained, and thus the instrument may be operated by an inexperienced as well as an experienced person and when improperly used is not in any way damaged.

In the use of the gage, the device is positioned with the fixed jaw or base member 2 against the member from which the height is to be determined, the set screw 32 is loosened, and the movable jaw 3 may then be moved along the extent of the measuring bar 1 to obtain the measurement roughly. The movable jaw 3 is then held in the rough adjustment and by turning the hand wheel 25, the adjustable collar 24 is moved upon the worm case 13 and the spring 27 brings the worm thread 21 into engagement in the worm track 10 and then upon turning of the hand wheel 28 to manipulate the worm 17, the worm thread 21 will work in the worm track 10 and the finest adjustment may be obtained to bring the knife blade edge 9 to an accurate measuring position with respect to the member to be measured in its height from the member on which the jaw 2 is positioned. When this measurement has been obtained, if it is desired to retain the same, the set screw 32 is tightened and with this screw tightened, further turning of the hand wheel 28 will not move the adjusted setting but will cause the worm thread 21 to run out against the tension of the spring 27.

While I have herein shown and described one specific form of my invention, it will be understood that slight changes might be made in the form and arrangement of the several parts without departing from the spirit and scope of my invention, and hence I do not wish to be limited thereto except for such limitations as the claims may import.

I claim:

1. A height gage comprising a measuring bar, a fixed jaw connected with one end of said measuring bar, a movable jaw slidably mounted upon said bar to be adjusted along the length thereof with respect to the fixed jaw, a rack formed on said measuring bar, a volute worm member carried by the movable jaw to have revoluble movement thereon with the axis of rotation disposed at an angle to the sliding path of said jaw, and means to be adjusted to hold said worm member in an inoperative position.

2. A height gage comprising a measuring bar, a fixed jaw connected with one end of said measuring bar, a rack formed along the extent of one of the longitudinal edges of said measuring bar, a movable jaw slidably mounted on said bar, a volute worm member revolubly mounted on the movable jaw to normally have the threads thereof in the teeth of said rack, means to be adjusted to hold said worm member in an inoperative relation, and means to hold the movable jaw rigidly secured to the measuring bar to retain a measurement irrespective of the setting of said worm member.

3. A height gage comprising a measuring bar, a fixed jaw connected with one end of said bar to form a permanent measuring point, a movable jaw slidably mounted upon said bar, a rack provided on the measuring bar, a volute worm member revolubly mounted on the movable jaw and having its axis of rotation disposed at an angle in the direction of sliding movement of said jaw upon the bar and provided with worm threads to engage with the teeth of said rack to adjust the movable jaw along the length of the measuring bar as the worm is turned, and means to be manually moved to disengage the worm threads from the teeth of the rack to cause the worm member to become inoperative.

4. A height gage comprising a measuring bar, a movable jaw slidably mounted on said measuring bar, a rack provided on said bar, a case carried by the movable jaw at a point adjacent the disposition of the rack on the measuring bar, a volute worm member revolubly mounted in said case to have endwise sliding movement therein and provided with a worm thread adapted to be engaged within the teeth of the rack, and a spring to normally hold the worm member in a position that the thread thereof is in mesh with said teeth.

5. A height gage comprising a measuring bar, a movable jaw slidably mounted on said bar, a rack provided on the measuring bar, a case carried by the movable jaw at a point adjacent said rack, a worm member revolubly mounted in said case and having its axis of rotation disposed at an angle to the path of sliding movement of said jaw and provided with a volute worm thread, a spring to normally hold said worm member in a position that the worm thread thereof may engage with the teeth of said rack and upon turning of the worm member the movable jaw will be adjusted along the length of the measuring bar, and means to hold the movable jaw rigidly secured to the measuring bar at the measurement obtained.

6. A height gage comprising a measuring bar, a fixed jaw connected with one end of said measuring bar to provide a permanent measuring point, a movable jaw slidably mounted on said measuring bar, a rack provided on one face of the measuring bar, a case carried by the movable jaw at a point adjacent the disposition of said rack, a worm member slidably and revolubly mounted in said case and provided with a volute worm thread to be capable of engagement and mesh with the teeth of said rack, a spring to normally hold said worm member in a position that the thread thereof is in engagement with the rack, and means carried by said case to be manually moved to a position to hold the worm member out of engagement with the rack.

In testimony whereof I affix my signature in presence of two witnesses.

CHARLES G. SCHMITTNER.

Witnesses:
CHARLES M. DENGLER,
MICHAEL SMITH.